United States Patent [19]

Nedeljkovitch

[11] 3,910,137
[45] Oct. 7, 1975

[54] ROTATIVE TRANSMISSIONS AT INFINITELY VARYING RATIOS

[76] Inventor: Radovan Nedeljkovitch, 8 Square du Dragon, Residence St. Michel, Le Chesnay, France, 78150

[22] Filed: Nov. 7, 1973

[21] Appl. No.: 413,555

[30] Foreign Application Priority Data
Nov. 17, 1972 France .............................. 72.40848
Feb. 19, 1973 France .............................. 73.05724

[52] U.S. Cl. .................... 74/796; 74/190; 74/191; 74/214
[51] Int. Cl.² ................... F16H 15/16; F16H 15/50
[58] Field of Search ............ 74/191, 193, 190, 192, 74/214, 796, 190.5, 640; 310/81; 259/1

[56] References Cited
UNITED STATES PATENTS

| | | | |
|---|---|---|---|
| 2,194,410 | 3/1940 | Svenson | 259/1 |
| 2,209,023 | 7/1940 | Jett | 74/191 |
| 2,480,825 | 9/1949 | Adolph | 310/81 |
| 2,559,230 | 7/1951 | Schottler | 74/191 |
| 2,570,493 | 10/1951 | Schmidt | 74/193 |
| 3,227,004 | 1/1966 | Orain | 74/796 |
| 3,530,742 | 9/1970 | Sfredda | 74/191 |
| 3,530,742 | 9/1970 | Sfredda | 74/796 |
| 3,630,095 | 12/1971 | Eakin | 74/191 |

FOREIGN PATENTS OR APPLICATIONS
1,141,243 8/1957 France .............................. 74/796

*Primary Examiner*—Samuel Scott
*Assistant Examiner*—Allan R. Burke
*Attorney, Agent, or Firm*—Thomas N. Young

[57] ABSTRACT

A rotative motion converting device of the conical pendulum type, comprising a stationary base member having an axis and an internal rolling path, and a pendulum linked by a universal joint to a shaft coaxial with said base member, said pendulum having an external rolling path, wherein the generants of said two rolling paths are complementarily shaped such that a very close contact may be obtained therebetween provided said pendulum may be axially shifted only a minute distance from its still position.

A preferred application of this invention is a speed converter of high performances, provided by combining two basical devices of this kind.

8 Claims, 21 Drawing Figures

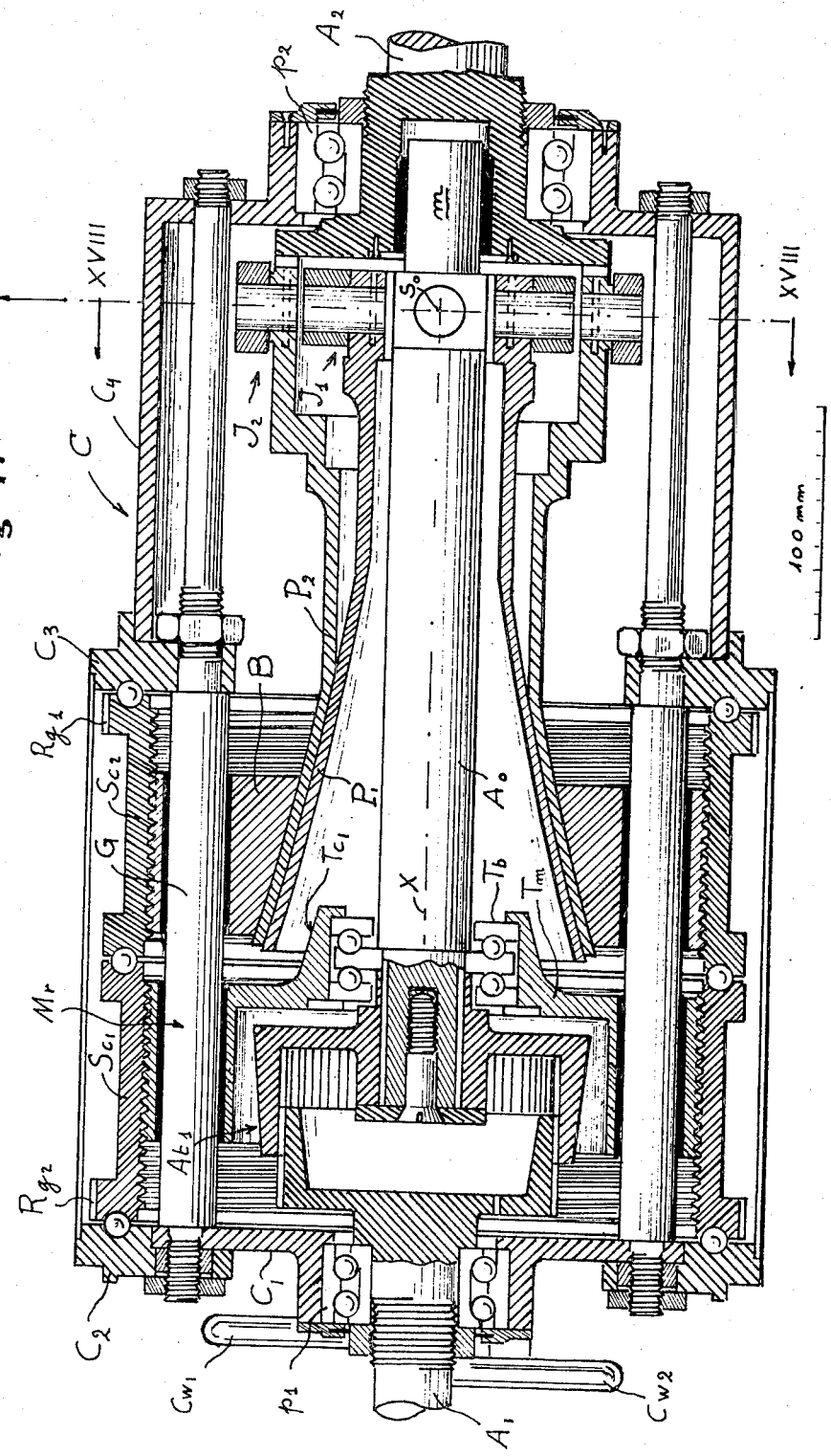

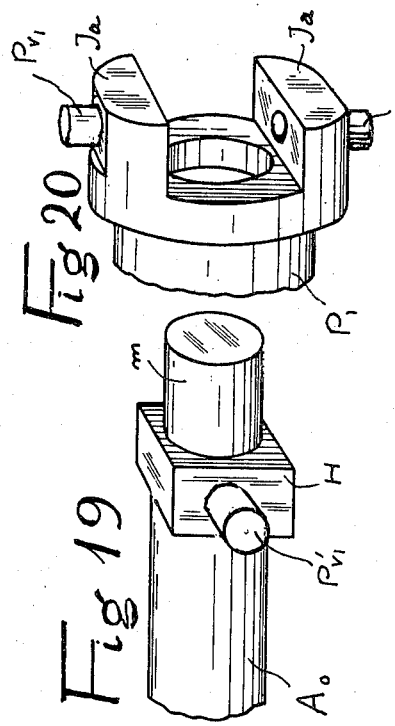
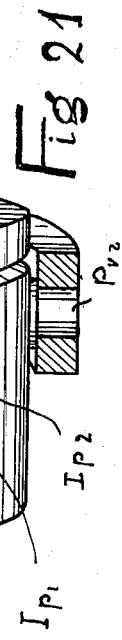
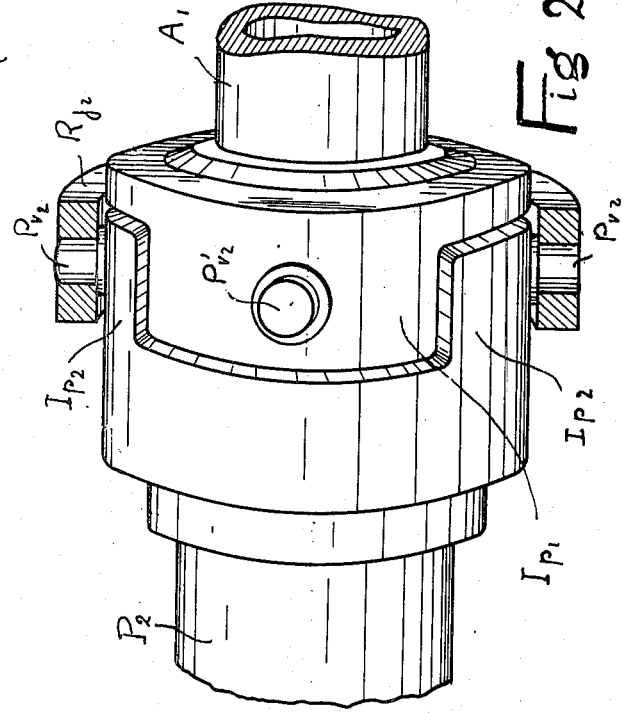
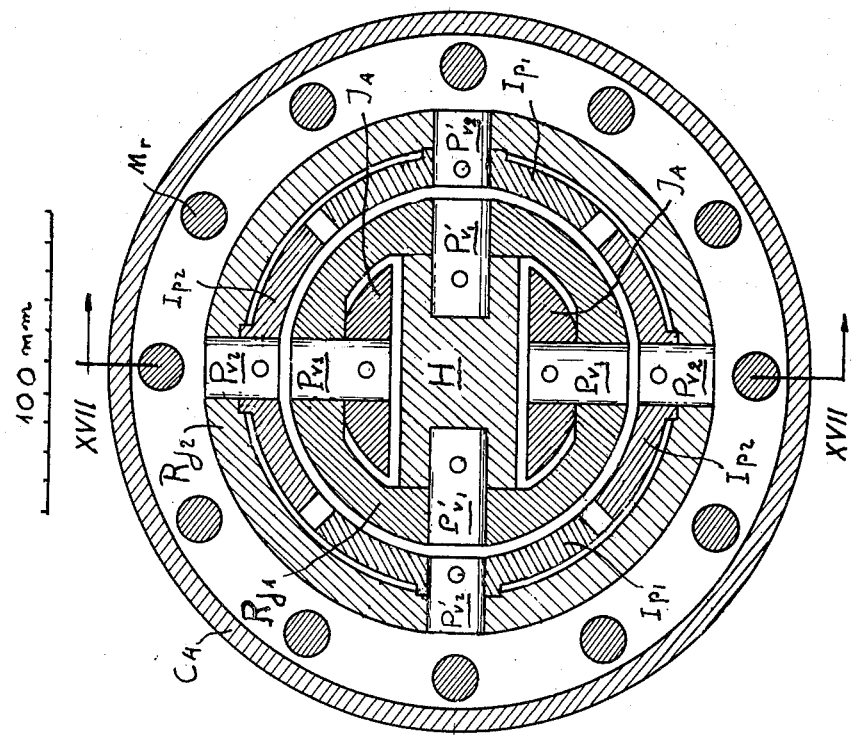

ROTATIVE TRANSMISSIONS AT INFINITELY VARYING RATIOS

The present invention concerns the rotative transmissions at infinitely varying ratios.

Such transmissions which are known presently are far from being satisfactory as concerns efficiency, weight, volume, available power and reliability.

These transmissions may be used either as integrated motorspeed variators wherein a motor means is directly coupled to the transmission, or pure speed converters including an input shaft coupled to an engine, usually of constant speed, and an output shaft for utilisation at variable speed.

However, these two kinds of transmissions use both the same essential devices, among which there are electrical, hydraulical and purely mechanical devices.

The electrical devices need at least a duplication of D.C. machines, i.e. the provision of a generator and at least one motor. Moreover, it is well known that a D.C. motor, when used at very different speeds, is extremely far from running at its best efficiency rate.

The hydraulic transmissions are capable of converting important power, but their efficiency is scarcely above 80%, so that their use with automotives is generally unwelcome in countries where gasoline is heavily taxed.

Among the mechanical variable speed transmissions, the conical pulleys with variably spaced flanges cooperating with a belt of trapezoidal cross section is used world-wide, but only with mean power, namely due to the difficulty of having several straps in parallel identical working, and their efficiency is weak owing to the jamming and unjamming of the belt at each passage on a pulley.

Another known mechanical type uses tangential contacting wheels. The power which such a wheel may transmit to another one is depending from their mutual adherence, which itself results from the nature of their contact.

Now, this contact is essentially conditioned by the two following factors:

a. the nature of the contacting surfaces (material out of which the wheels are made, and the condition of the surface which may be smooth, rough or splined);

b. the geometrical shape of the surfaces.

Considering more especially this last point, it is known that the contact between two wheels mutually rolling on each other is never punctual or linear, but is transmitted through an area s resulting from the elastic deformation of the contacting parts under the effect of a contact pressure n, which is due itself to a force N (of gravity or centrifugal or else) applying the wheels upon each other.

The stronger the pressure n, the greater the area s with a pair of given wheels.

If f is the friction coefficient between the wheels and T the tangential driving effort of one wheel upon the other, the maximum value of T is:

$$T = fN = fns$$

As $f$ is given and $n$ has a limited value which ought not be trespassed one cannot increase $T$ (hence the transmitted power) except in increasing s by purely geometrical means, i.e. by giving the contacting surfaces of the wheels such shapes that, with a given pressure $n$, the area s be the greater possible and this, within the whole scope of variations of the speed ratio used.

Such is the basical idea which inspired the present invention. This idea does not seem to have been grasped by the inventors of the contacting wheel transmissions which are known till now.

Generally, indeed, such transmissions by rolling contacting wheels consist in one wheel shaped as a disc on one surface of which is applied the periphery of the other wheels. This second wheel, of given diameter, may be displaced along its own axis such as to meet the first wheel at different distances from the axis of said first wheel, i.e. at different radiuses of this same. But, the second wheel in such a device cannot have but a very weak width. In addition, the contact of a wheel on a plane surface cannot give a contacting area other than mean with respect to the dimension of the wheel. Accordingly, such a device is only used for very mean power, namely for monitoring or control systems.

In the same type of transmissions by contacting rolling wheels one may cite also the transmissions known as conical pendulum transmissions, wherein a planetary pendulum is linked to a shaft by means of a universal joint, said pendulum having an outer rolling path and being driven such as to roll into an internal rolling path of a stationary member, causing thereby a gyratory motion of the pendulum axis around the axis of the stationary member and a recessive rotative motion of the shaft which is correlative to said gyration motion. An example of such a device is shown in U.S. Pat. No. 3,227,004 to M. Orain, issued Jan. 4, 1966.

The ratio between the speeds of these two movements is depending on the position of the joint center along the axis of the stationary member.

Such a device is reversible, so that it may be used either by applying to the pendulum a rotating force causing it to roll into the base member and obtaining a variable speed of the shaft, or the shaft may be driven and cause the gyration of the pendulum axis at a speed which may be very high.

The devices of this type which are known in the art provide improvements over the above cited types of contact transmissions as they show contacting wheels having inner contacts; but the shapes of the wheels as well as the working thereof are such that the contacting area of the pendulum within its base member is, here also, very weak.

Then, it happens that no system of transmission is known, till now, allowing the transmission of a high mechanical rotating power with infinitely variable speed ratio and with a high efficiency.

To fill this gap, the present invention discloses a rotative motion converting device of this type wherein the pendulum external path is a surface substantially conical the apex of which coincidates with the joint center and the base internal path is another substantially conical surface, the generating lines of said two surface being complementarily shaped such that a very close contact of said surfaces may be obtained within the axial common plane of their mutual rolling contact as well as within at least one plane perpendicular to the base axis provided that said joint center position remain located within a very short axial distance defining the whole range of said speed ratio variations, said distance being limited on one side by the base conical surface apex defining the zero value of said ratio.

In such a transmission, said ratio between the recessive speed of the shaft and the gyratory rotation of the pendulum axis is then always very weak, and the gyratory motion of the pendulum axis may be high, by example of 60,000 rpm with a recessive rotative speed of the shaft which may be, by example, of 1,200 rpm, yielding a recessive/gyratory ratio equal to 0.02.

The amplitude of the pendulum gyration is also of very weak angular value, but owing to the high gyratory speed, a considerable centrifugal force is generated. This force provides an excellent adherence of the pendulum against its basis without damaging thereby the contacting surfaces as a result of said great contacting area.

It must be noticed also that these great centrifugal efforts are not in any way supported by the universal joint nor by the shaft bearing. Besides, these considerable efforts do not cause any appreciable vibrations of the mass of the machine, for this is a rotating force, the projection of which on an axial plane is vibratory and the frequency of which is very high and provides an almost complete dampening of its vibratory effects.

Although the device according to this invention may be applied in various ways, its preferred application concerns the speed converters. In a speed converter according to the invention, two transmission devices are coupled coaxially and in opposition such that the pendulum of a first device is rolling within the inner path of the pendulum of the second device while said last pendulum is rolling within a common stationary base member, and said first pendulum is driving said second one by the centrifugal force generated in said first pendulum, so that the shafts of said first and second devices constitute the input shaft and the output shaft of the speed converter respectively, the speed ratio between these two shafts being set by shifting the joint centers of said two devices with respect to said base member along their common axis.

But this invention will be better understood by the description which will be given hereafter, by way of example, of some of its embodiments with reference to the accompanying drawings wherein:

FIG. 17 is an axial section of a second embodiment of a speed converter, at still;

FIG. 18 is a cross section of the universal joints along the lines XVIII—XVIII of FIG. 17;

FIGS. 19 and 20 are perspective views of the arrangement of the inner joint; and FIG. 21 is a perspective view of the outer joint.

Figure 1:
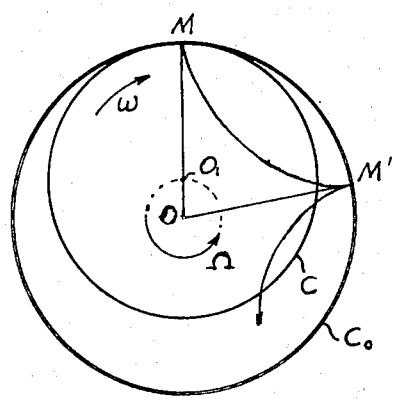
FIG. 1 is a diagram of the hypocycloidal movement.

On FIG. 1, one may see the principle of the hypocycloidal movement, wherein a planetary member which is a circle of center $O_1$ and radius R is rolling within a circular base $C_0$ of center O and radius Ro, so that the center $O_1$ is gyrating around O with a speed $\Omega$. Mathematical demonstration shows then that the planetary surface is driven in a recessive rotation of speed $\omega$, the ratio between these two speeds being:

$$\eta = \frac{\omega}{\Omega} = \frac{Ro - R}{R}$$

The nearer is R to Ro, the more intimate is the contact between the two circles (until they coincidate when R = Ro) and the weaker is the above ratio.

It results therefrom that, in order to obtain a recessive speed valid for practical uses with such a weak ratio, the gyratory motion must be high.

Figure 2:
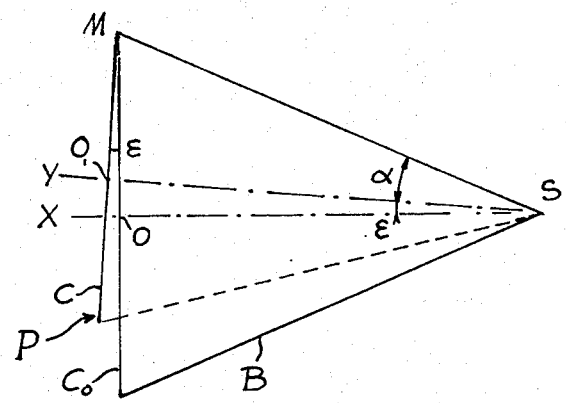
FIGS. 2, 3, 4 are diagrams of the conical pendular movement.

On FIG. 2, a conical pendulum P is rolling within a stationary conical basis B both of same apex S. In this motion, a circle C of the pendulum is rolling within a circle Co of the base. If $\alpha$ is the mean cone angle of the pendulum, the axis of which is Y, and if $\epsilon$ is the slope of this last axis Y with respect to the axis X of the base B, the ratio between the recessive speed $\omega$ of the pendulum and the gyratory speed $\Omega$ of the axis Y of this same around said axis X is given by the formula:

$$\eta = \frac{\omega}{\Omega} = \frac{\epsilon}{tg\alpha}$$

from which we draw: $\omega = \eta \, tg \, \alpha$

By way of example, if $tg \, \alpha = \frac{1}{4}$, and if we wish to obtain a ratio $\eta = 0.02$, it suffices that the axis Y be sloped with an angle $\epsilon = 0.02 \times 0.25 = 0.005$ radian, i.e. 0.287 sexagesimal degree = 0° 17′ 12″.

Figure 3:
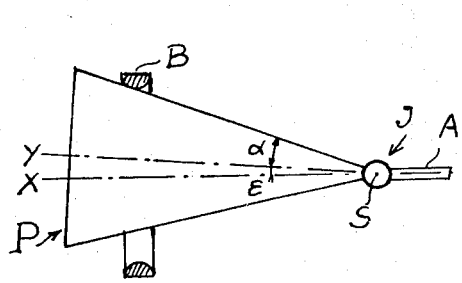

On FIG. 3, we may see how the recessive speed of the pendulum may be made available at a shaft A by means of a universal joint J, the base B being merely indicated by a surface element which may be of any desired kind provided it defines a conical surface wherein the pendulum is theoretically rolling. On this FIG. 3, the pendulum is given the effective form of a cone.

On this figure, one may see that a displacement of the joint center along the base axis X causes a change in the value of angle $\epsilon$, then a change in the ratio of the recessive and gyratory speed. This variation may be seen more clearly by referring to FIG. 4.

Figure 4:
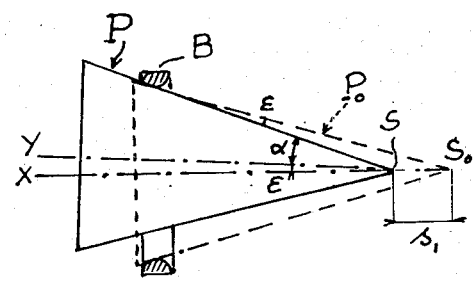

It is clear that, with the devices shown on FIGS. 3 and 4, the contact between pendulum and basis is very far from being close within the axial plane of contact, (which is just the plane of the figure in said both FIGS. 3 and 4).

Other shapes have been given to the pendulum and basis generants in the devices of the known art, but none of these latter disclosed generant shapes providing a contact really close for the whole range of the speed ratio variations.

Figure 5:
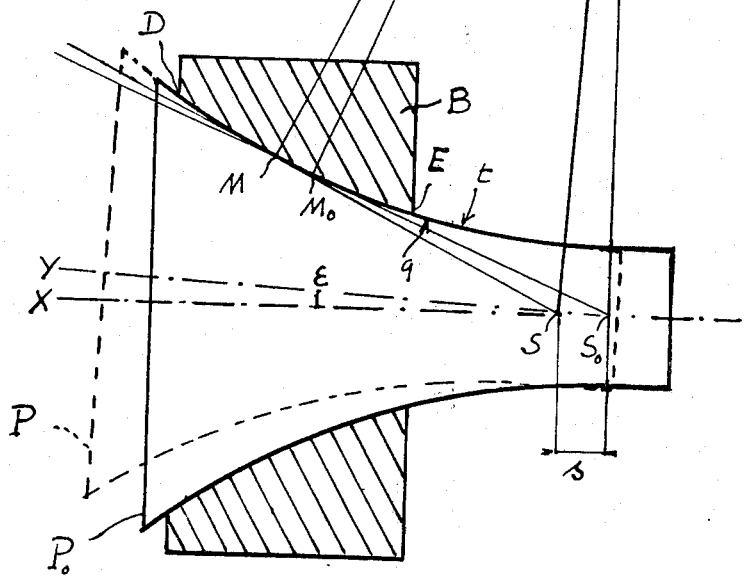
FIG. 5 shows the contacting surfaces shapes according to the invention.

A motion converting device having the basical contact shaping disclosed in the present invention is shown at FIG. 5 where the base generant is a circular arc q the center Q of which is situated on a straight line perpendicular to the axis X of the base member and passing through the apex $S_o$ of the base cone. The associated generant of the pendulum is another circular arc t identical with the former. It is clear that the center Q coincidates with the instantaneous center of rotation of the pendulum generant when the pendulum apex S is displaced a minute distance s. As a result, such a device enjoys, in the axial plane of the contact of the pendulum with its base, a whole contact along the entire length of the facing parts of said circular generants.

Such a contact may be called "osculatory."

In FIG. 5, the generant shapes have been shown with a very exaggerated curvature for a better understanding of the drawings.

Taking anew the preceding example where $tg\ \alpha = \frac{1}{4}$, $\epsilon = 0.005$ radian and $\eta = 0.02$, if the conical path of the base has a mean inner redius $Rm = 62$ mm and a width $l = 70$ mm, the calculation of $r = QM$ yields a value nearly equal to 1 meter, so that the arcuate portion ED may have a bulging the value of which may be appreciated by the distance from the chord to the arc which is equal to 0.63 mm in the middle of said chord.

As to the maximum distance between the profiles $t$ and $q$ during the pivoting of the pendulum profile around $Q$, it is lower than a micron (0.001 mm) with a ratio $\eta$ varying from 0 to 0.02 and a shifting $S_0S$ equal to 5.2 mm.

Figure 6:
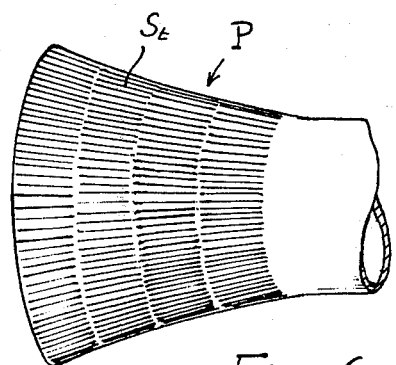
FIG. 6 is a perspective partial view of a pendulum with a finely splined surface.

FIG. 6 shows a pendulum having fine plines $S_t$ engraved on the usable path thereof, along axial directions; these splines may be stepped in order to take in account the diameter changes. The duty of these splines is to preclude the formation of an air sheet between the pendulum and its basis at high gyratory speeds, while increasing the circumferential adherence of the pendulum in this basis without increasing the axial adherence which must be kept as weak as possible to allow axial displacements of said pendulum with a minimum effort.

Reverting again to the general example of FIG. 3, it may be clearly understood that, when a rotating force is provided to apply any pendulum P on its base B so that the pendulum rolls within said base, the shaft A will be driven in rotation, through the joint J whatever may be the rotating force (mechanical, centrifugal, fluidic, electrical or else) causing the pendulum rolling gyration. This is a first working of the device.

Inversely, when a driving rotating torque is applied to the shaft A, the pendulum will initiate and keep a gyratory rolling movement provided that suitable priming conditions are gathered, namely: an optimum clearance between pendulum and base, and a rough circumferential contact therebetween as provided by the splines shown on FIg. 6. This is the second working of the device.

This device, then, taken under its most general form, is reversible. The particular form of this device, which is the basical feature disclosed by the present invention and illustrated at FIG. 5, will enjoy the same advantage of reversibility.

It may be thus applied either so a motor-speed variator according to its first working, or to a vibration generator according to its second working.

But in a preferred application of the present invention, said basical device is used in double combination according to its both workings, as will be seen just as follows.

Figure 7:
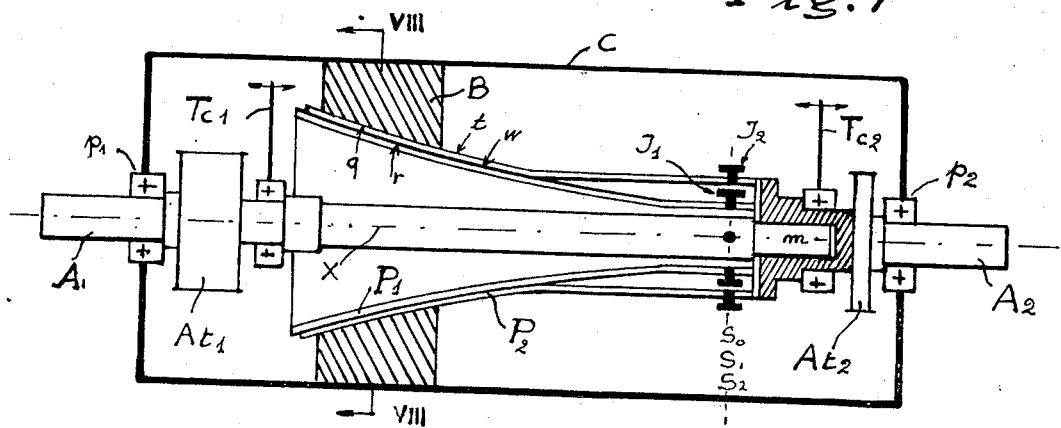
FIG. 7 and 8 show schematically in axial and cross section a first embodiment of a speed converter according to the present invention, at still.
Figure 8:
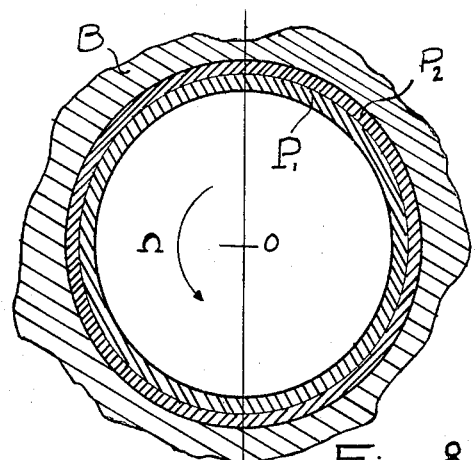

FIGS. 7 and 8 show a speed converter at still, comprising two devices according to the invention, said devices being coupled coaxially and in opposition. The first device has a shaft $A_1$ which is the input shaft of the speed converter. The pendulum $P_1$ of said first device is the first pendulum of the converter. It includes an external path w and is linked to the shaft $A_1$ by a joint $J_1$ which is the first joint of the converter. The second device includes a shaft $A_2$ which is the output shaft of the converter and a pendulum $P_2$ having an outer path $t$ and an inner path $r$. This pendulum $P_2$ is the second pendulum of the converter, and it is linked with the shaft $A_2$ by means of the joint $J_2$ of the second device which is the second joint of the converter. A common base member B is fixedly mounted within the housing C. The shafts $A_1$ and $A_2$ are respectively supported by two bearings $P_1$ and $P_2$ which are both fixedly secured to the housing C.

In the embodiment presently described, the joints $J_1$ and $J_2$ are axially displaceable by shift control means $Tc_1$ and $Tc_2$ respectively associated with telescopic couplings $At_1$ and $At_2$, while the basis B is stationary. The provision of said telescoping couplings allows the shafts $A_1$ and $A_2$ to keep fixed axial positions.

As the relative distance between these shift control means $Tc_1$ and $Tc_2$ may change, it is necessary to provide a telescopic mounting of the portion $A_o$ of the shaft $A_1$ which lies between said two shift control means. Such a mounting comprises a portion m of the shaft $A_o$, which is journalling within an antifriction bearing managed within the shaft $A_2$. As these two shafts $A_1$ and $A_2$ rotate in the same sense and at low speed, such a kind of bearing is quite suitable.

Figure 10:
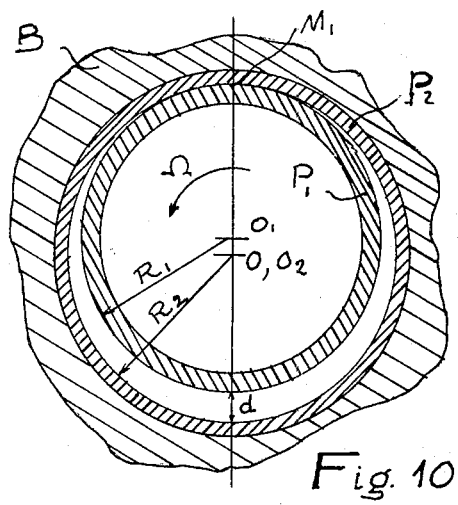
FIGS. 10, 12, 14 and 16 show in cross section the same successive working states respectively of the speed converter of FIGS. 7, 8.
Figure 9:
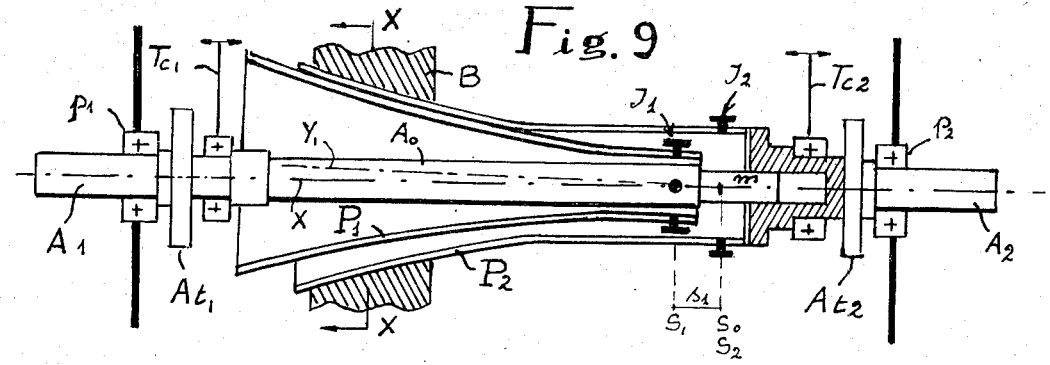
FIGS. 9, 11, 13 and 15 show in axial section and the corresponding

FIGS. 9 and 10 show the converter in its "energized" state, wherein the pendulum $P_1$ is shifted to the left, a distance $s_1$. The shaft $A_1$ is driven in rotation at a constant speed $\omega_1$ by an engine (not shown), that which causes pendulum $P_1$ to gyrate at a speed $\Omega$. Such a gyration results from the reversibility of the basical device of this invention as shown hereabove.

But this gyration may prove unable to start directly by rotation of shaft $A_1$ at the normal working ratio $\eta = (\omega_1/\Omega)$ as this latter may be too weak (of the order of 2/100). It is then necessary to start the gyration under different conditions, by example at a higher ratio (of the order of 6/100) and at a lower speed of shaft $A_1$ for avoiding excessive initial vibration, and then to take back ratio $\eta_1$ as well as $\omega_1$ to their nominal working values.

During this first stage of energization of the converter, the pendulum $P_2$ remains fitted in the base B and is standing still. The axial position of pendulum $P_1$ will stand stationary during the next workings of the converter for the clarity sake of the description. This fixed position ascribes a very nearly constant value to the gyration speed $\Omega$ provided that the engine speed $\omega_1$ is kept constant, that which is most desirable in many applications.

Figure 12:
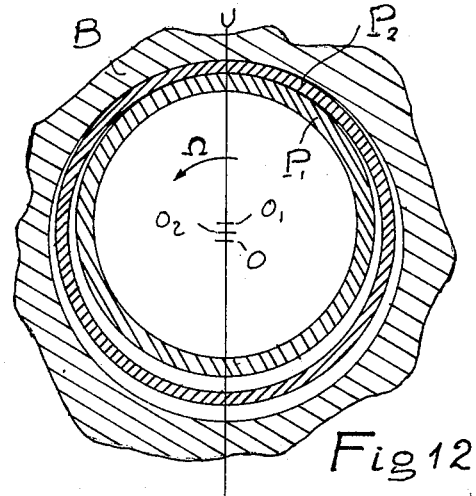
Figure 11:
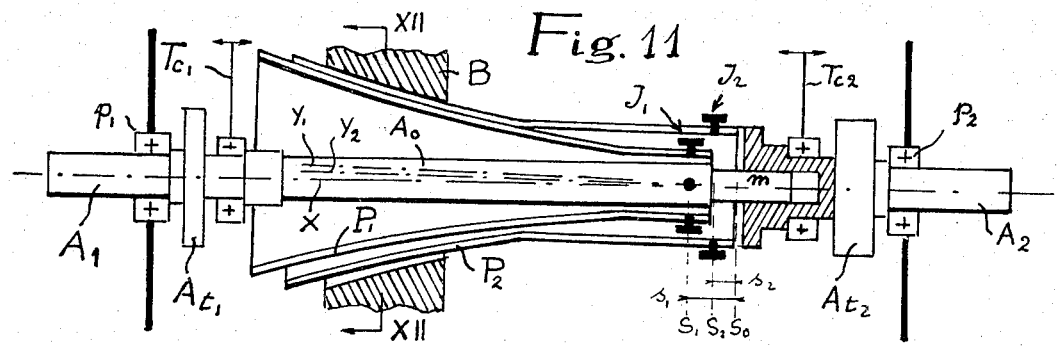

FIGS. 11 and 12 show a next stage wherein the pendulum $P_2$ has been in its turn shifted at the left a distance $s_2$. At high gyratory speed, the pendulum $P_1$ exerts upon the pendulum $P_2$ a considerable centrifugal pressure which applies it against the base B and drives it in gyratory movement at the same speed that itself, while causing recessive rotation of the shaft $A_2$ at a speed $\omega_2$ which is depending from $s_2$. As it may be seen on FIG. 12, the contacts of $P_1$ in $P_2$ and of $P_2$ in B are both within a same axial half-plane OU. Such as the case at least as long as the shaft $A_2$ is no loaded by any resisting torque. Then, it may be said that the two pendulums of the converter rotate at speed synchronism and in phase concordance.

Figure 14:
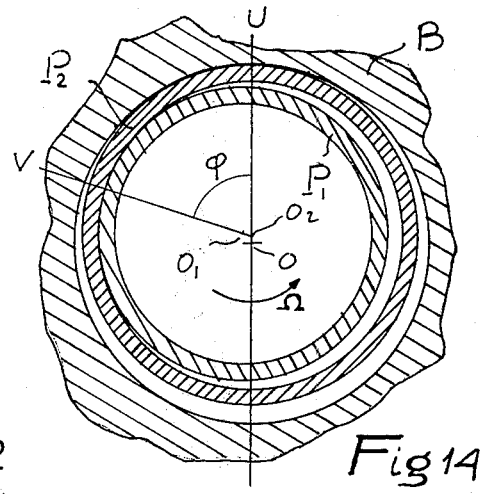
Figure 13:
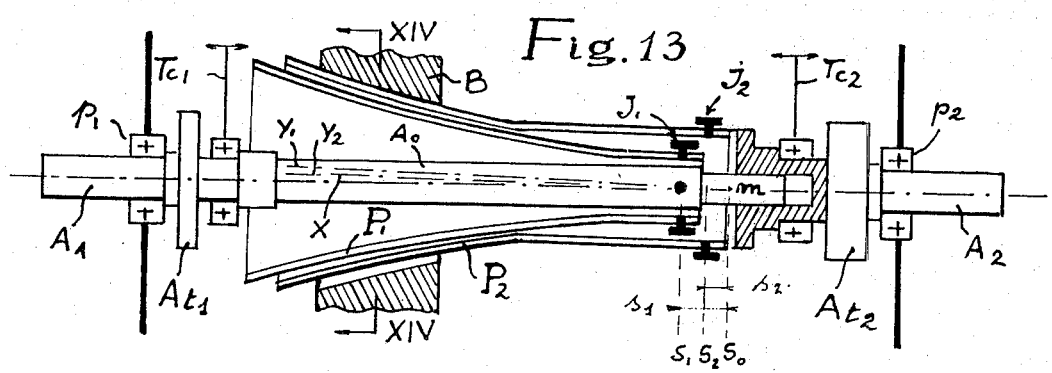

When a resisting torque is applied to the output shaft $A_2$, it may be seen, on FIGS. 13 and 14, that the contact of $P_1$ in $P_2$ occurs within an axial half-plane OV which is angularly shifted by an angle $\phi$in advance with respect to the contact of $P_2$ in B which lies within the axial half-plane OU. One may see, in other words, that it is the driven pendulum $P_2$ which is out of phase by a lag angle $\phi$ with respect to the driving pendulum $P_1$.

Figure 16:
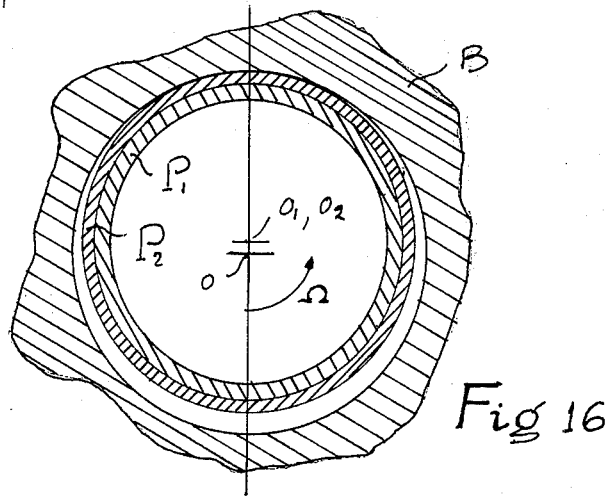
Figure 15:
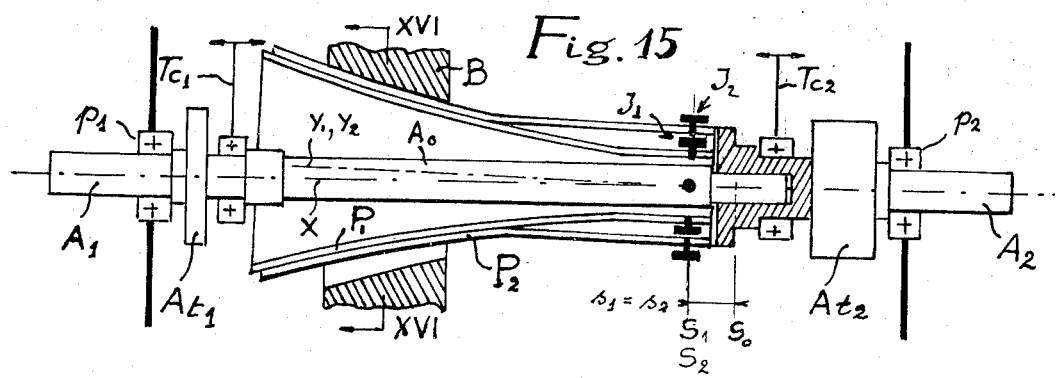

In proportion as the joint $J_2$ is shifted at the left, the speed $\omega_2$ of the output shaft $A_2$ increases. This speed reaches its maximum value, which is equal to the speed $\omega_1$ of the input shaft when the pendulum $P_2$ is completely shifted at the left until it comes at fitting contact with the pendulum $P_1$. Such is the stage of FIGS. 15 and 16.

In order to have the converter coming again at stand still, one must shift joint $J_2$ in opposite direction, i.e. at the right until its center $S_2$ coincidates anew with the center $S_o$ of the base cone, so that $P_2$ and $A_2$ are again stationary (according to FIG. 9).

Then, the joint $J_1$ is again shifted at $S_o$ (reverting thus to the state of FIG. 7) after having uncoupled shaft $A_1$ from the driving engine to avoid a sudden blocking of this latter.

In a second embodiment, shown at FIG. 17, of a speed converter according to the present invention, the joint center $J_2$ linked with the second outer pendulum $P_2$ is stationary, the base member B is axially shiftable by means of a suitable translating system, and the first joint center $J_1$, linked with the inner pendulum $P_1$, is shiftable by means of a telescoping coupling $At_1$ and its associated shift mechanism $Tc_1$, wereby the shifts of said first and second joint centers $J_1$, $J_2$ relative to said base member B are provided by properly combining the displacements of said first joint center $J_1$ and said base member B. Such an arrangement is advantageous in that it needs only one single set "telescoping coupling - shift mechanism" instead of two.

The speed converter shown at still, in axial section, on FIG. 17 is a practical embodiment, at the scale indicated, of a unit rated for 250 HP, with an input speed of 1200 rpm, an output speed varying from 0 to 1200 rpm, and a gyratory motion of 60,000 rpm.

On this FIG. 17, the reference letters are the same as those put at FIG. 7 on the same parts of the speed converters.

The housing C is composed, as shown, of different parts $C_1$, $C_2$, $C_3$, $C_4$ strongly assembled by a plurality of mounting rods Mr regularly disposed around the converter axis X. In the unit described, twelve such rods Mr are provided, forming thus with the other housing parts a very rigid and strong frame assembly.

Two controlling sleeves $Sc_1$ and $Sc_2$ are mounted between said housing parts $C_2$ and $C_3$ through a triple row of balls such that these sleeves may be free to rotate but not to move axially.

The base member B is a composed assembly (the details of which is not shown) in order that it may be mounted on the outer pendulum outer surface in view of the radial dimension of the outer joint $J_2$.

Said base member B is smoothly mounted free to reciprocate on the gliding parts G of the rods Mr, with antifriction bearings. The outer surface of the base B bears threads engaging corresponding threads of the sleeve $Sc_2$. This latter bears a ring gear $Rg_1$ which is in meshing engagement with a gear (not shown) actuated by a control wheel $Cw_1$.

By rotating, manually as otherwise, the control wheel $Cw_1$, the ring gear $Rg_1$ is rotated and the base B is axially displaced accordingly.

The shift mechanism $Tc_1$ controlling the axial displacements of the middle shaft $A_o$ linked to the inner pendulum $P_1$ comprises a translating member Tm which is smoothly mounted reciprocating on said gliding portions G of the rods Mr. The inner part of said member Tm is axially fixed to the middle shaft $A_o$ by means of a double effect thrust bearing Tb. The outer surface of said member Tm bears threads engaging corresponding threads of the controlling sleeve $Sc_1$. This latter bears a ring gear $Rg_2$ in meshing engagement with another gear (not shown) actuated by a control wheel $Cw_2$.

By rotating this latter, manually or otherwise, the ring gear $Rg_2$ will rotate, and the translating member $Tc_1$, hence the middle shaft $A_o$ and the joint $J_1$, will be axially displaced accordingly.

The universal joints $J_1$ and $J_2$ are shown in cross section at FIG. 18, wherein their respective pivots $Pv_1$, $Pv'_1$ and $Pv_2$, $Pv'_2$ are shown in alignment for the clarity of FIG. 17.

The first universal joint $J_1$ is represented also in perspective views of some of its parts on FIGS. 19 and 20.

The middle shaft $A_o$ bears, towards its right end, a hammer like piece H cooperating with the joint ring $Rj_1$ and pivotally linked therewith by pivots $Pv'_1$. The inner pendulum $P_1$ has, at its right end, a pair of jaws Ja devised for straddling the hammer like piece H and to be linked to the ring Rj, by means of pivots $Pv_1$.

The second universal joint $J_2$ is shown in perspective view at FIG. 21. The outer pendulum $P_2$ and the output shaft $A_2$ have imbricated parts $Ip_1$ and $Ip_2$ respectively linked to the joint uniting ring $Rj_2$ by means of pivots $Pv_2$ and $Pv'_2$.

Some formulae will be now quoted from a general theory of this type of converter which has been worked out by the inventor, and practical calculations will be derived therefrom.

Assuming first that the inner pendulum is shifted a distance $s_1$ from the base cone apex $S_o$, the outer pendulum being still in fitting engagement within said base B corresponding to the state of FIG. 9, we have the yet given formula $$\eta_1 = \frac{\omega_1}{\Omega} = \frac{\epsilon_1}{tg\alpha}$$

where:
   $\omega_1$ is the input shaft speed in rad/sec. is the gyration speed of the inner pendulum in rad/sec.
   $\epsilon_1$ is the angle of the inner pendulum axis with the base axis.
   $\alpha$ is the mean cone angle of the pendulums conical paths.

It has been yet calculated that, if $$\eta_1 = \frac{2}{100}, \ tg\alpha = \frac{1}{4},$$

we have:

$$\epsilon_1 = \eta_1 \cdot tg\alpha = \frac{2}{100} \times \frac{1}{4} = \frac{1}{200} \ \text{radian} = 0° \ 17'12''.$$

The corresponding shift $s_1$ is given by the formula:

$$s_1 = h \, \epsilon_1$$

where $h$ is the height of point Q above the axis. By construction, in the embodiment described, $h = 1,060$ mm, thence:

$$s_1 = 1,060 \times 1/200 = 5.3 \text{ mm}$$

In the mean plane of the base member which is the plane of FIG. 10, the radiuses $R_1$, $R_2$ of the paths $w$ and $r$ have been designated.

It may be demonstrated that the ratio $\eta_1$ may be expressed as follows as a funtion of these radiuses:

$$\eta_1 = \frac{R_2 - R_1}{R_1},$$

thence the eccentricity $$e = R_2 - R_1 = \frac{\eta_1}{1 + \eta_1} R_2$$

As $R_2 = 60$ mm, $e =$ nearly 1.2 mm, or $d = 2.4$ mm for the maximum spacing between the two pendulums within the plane of FIG. 10.

This spacing of 2.4 mm is small in comparison to the diameter of 120 mm of the path $r$ wherein is rolling the path $w$, but it is enough for keeping the gyration of said first pendulum $P_1$ as a result of the rotation of shaft $A_o$.

And this is just by the smallness of this spacing that a very close contact is made possible between said two pendulums $P_1$ and $P_2$ for such a contact intimacy exists not only, as yet shown, in the axial contacting plane, but also in any cross-sectional plane passing through the base member B, and namely the mean plane of the base member.

The only compelling condition resulting from the smallness of said spacing is the corresponding smallness of the internal ratio $\eta_1$ of the converter, but there is no problem provided the speeds $\omega_1$ and $\Omega$ are rightly choosen.

As said hereabove, we took, for the input shaft, a speed of 1,200 rpm yielding $$\omega_1 = \frac{2\pi}{60} 1200 = 125 \text{ rad/sec}$$

and for the first pendulum axis $Y_1$ a gyration speed of 60,000 rpm yielding $$\Omega = \frac{2\pi}{60} 60,000 = 6,280 \text{ rad/sec}$$

with the unit of FIG. 17.

Although the angle $\epsilon_1$ is very small as yet seen, the great value of $\Omega$ generates in the first pendulum $P_1$ very important inertial forces, which will be now calculated for the present working state of this converter.

The momentum $C_{\Delta_1}$ of these forces with respect to a transverse axis $\Delta_1$ (drawn form the apex $S_1$ of the first pendulum perpendicularly to the axial contacting plane of the two pendulums) is given by the formula:

$$C_{\Delta_1} = I_{\Delta_1} \, \Omega^2 \, \epsilon_1$$

where in $I_{\Delta_1}$ is the transverse inertial momentum of said first pendulum with respect to said axis $\Delta_1$.

If the first pendulum is made out of duralumin, calculations gives very nearly:

$I_{\Delta_1} = 0.04$ in unities of the International System, thence, with the data already given;
$C_{\Delta_1} = 0.04 \times (6280)^2 \times 1/200 = 7900$ joules $= 805$ mkg.

The resulting force $F_{N_1}$ may be taken at point $M_1$ of the FIG. 6 (which is in the middle cross sectional plane of the base member) and is equal to:

$$F_N = \frac{\sin \alpha}{R_2} C_{\Delta_1} = \frac{0.24}{0.06} \times 7\,900 = 31\,600 \text{ newtons or } 3\,220 \text{ kg.}$$

This value may seem considerable, at first sight, from the both standpoints of the mechanical resistance and of the vibrations of the converter parts.

But the resistance calculations show that the most loaded pieces can work without any danger. Taking namely the pendulum, their very shape enables them to resist the intertial forces as does a vault arc in especially advantageous conditions, namely due to the basical contact of the invention.

As to the vibrations, it must be considered that, in any stationary axial plane, the projection of the movements of the pendulums and of the forces generated thereby are vibrations of a relatively high frequency (amounting to 1,000 Hz in the example taken hereabove), which vibrations are dampened by the non gyrating mass of the converter.

If this latter is entirely made of duralumin, said non gyrating mass value is $M = 52$ kg. Now, the inertial force calculated above for the first pendulum must be doubled to roughly take in account the inertial forces of the second pendulum, yielding then a total vibrating force of $F_N = 6,440$ kg or 63,200 newtons.

It may be further admitted (that which is nearly right) that this resulting force $F_N$ is applied at the gravity center of the non gyrating mass, the maximum amplitude of vibration $x_m$ of said mass will be given by the formula:

$$F_N = M \, \Omega^2 \, x_m,$$

i.e.

$$63,200 = 52 \times 6280^2 \, x_m$$

thence $$x_m = 30.8 \times 10^{-6} \, m = 0.0308 \text{ mm}$$

or nearly 31 microns.

Such an amplitude is quite neglectible from the mechanical view-point although it requires that all the screwed parts be carefully locked as it is the case in almost rotative machinery.

As to the noise problem which is not unlikely to occur with a vibration at 1000 Hz, several effective means are known for removing this drawback.

On the other hand, it is necessary to emphasize the extreme interest of these very great inertial forces generated in the pendulums to urge the first pendulum against the second one and this latter against the base member, and that from the double viewpoint of the mutual grip between said elements and of the driving in gyration of said second pendulum by said first one as will be shown further on.

While thhis grip is effective as concerns the absence of any noticeable mutual rotative gliding of the pendulums and base member, it does not however prevent the needed relative axial gliding of these elements, since this latter gliding is small, of the order of 5 mm for pendulums which have about 300 mm in length, as seen herebefore.

Assuming that such an axial gliding of 5 mm is desired to be performed within a time duration of 1 second, one must consider that 1000 pendulum gyrations occur during the same time. As a result, this axial gliding operation is made considerably easier, in the same proportion as the steering wheel of an automotive is easier to move when the vehicle is running than when it is at stand still.

This is, of course, still easier if, as stated in relation with FIG. 6, one of the two paths in each couple of contacting paths $r - w$ and $q - t$ (see FIG. 7) bears fine splines engraved in axial planes.

For obtaining the state of FIG. 11 with the speed converter of FIG. 17, one must move conjointly the control wheels $Cw_1$ and $Cw_2$ such that, the first shifting $s_1 = S_oS_1$ remaining unchanged, the second joint center $J_2$ may be shifted a distance $s_2 = S_oS_2$ relative to the base cone apex $S_0$.

Such synchronous movements of the wheels $Cw_1$ and $Cw_2$ may be obtained, of course, with a mechanism (not shown) uniting temporarily said wheels so that said double rotation may be precisely and easily obtained by driving only one of them.

The output shaft $A_2$ is then set in rotation at a speed $\omega_2$, which is related to the input shaft $\omega_1$ by a formula, the simplicity of which is most remarkable:

$$\sigma = \frac{\omega_2}{\omega_1} = \frac{S_2}{S_1}$$

where $\sigma$ is the useable outer speed ratio of the converter (actually, it is the only speed ratio the user needs to know).

As $s_2$ may only vary between $o$ and $s_1$, it is clear that the output speed $\omega_2$ will vary between the values of O and $\omega_1$, and that by infinitely varying changes as a function of the likewise infinitely varying changes of $s_2$ when $S_2$ is relatively displaced in this same manner between $S_o$ and $S_1$.

Thus is effectively provided a speed converter with an infinitely varying speed ratio $\sigma$.

As concerns torques and power, if $\Gamma 1$, $\Gamma 2$ and $P$ are respectively the values of the input torque, the output torque, and the power transmitted through the converter, one may give, with the notations previously used, the following formulae which have been simplified with the admissions (which do not introduce significant errors) that the converter efficiency is equal to 1, and that the thickness of the pendulums are neglectible:

$$\Gamma 1 = G\ \sigma \sin \phi$$
$$\Gamma 2 = G \sin \phi$$
$$P = G\ \omega_1\ \sigma \sin \phi$$

with:

$$G = I \quad \sin^2\alpha\ \Omega\ \omega_1$$

Taking for I $\Delta_1$, $\alpha$, $\Omega$, $\omega_1$ the values previously choosen or calculated, the above formulae yield:

$$G = 0.04 \times \overline{0.24}^2 \times 6,280 \times 125 = 1,810$$

and $\Gamma 1 = 1,810\ \sigma \sin\phi$ joules $\Gamma 2 = 1,810\ \sin\phi$ joules $P = 226,000\ \sigma \sin\phi$ watts Assuming now that $$\phi = 60°,\ \sin\phi = 3/2 = 0.866,$$

$\Gamma 1 = 1,810\ \sigma\ 0.866 = 1,570\ \sigma$ joules or $160\phi$ mk, the maximum value of which is 160 mk for $$\sigma = \frac{\omega_2}{\omega_1} = 1$$

Then $\Gamma 2 = 1,810 \times 0.866 = 1,570$ joules or 160 mk; and $P = 226,000 \times 0.866\ \sigma = 195,700\ \sigma$ watts = 195.7 $\sigma$ kw, the maximum value of which is 195.7 kw, or 256 HP for $$\sigma = \frac{\omega_2}{\omega_1} = 1.$$

The embodiment of the speed converter, which has been just described, may be entirely made of duralumin.

Accordingly, the masses of its main components may be roughly listed as below:

| | |
|---|---|
| First inner pendulum $P_1$ | 2.40 kg |
| Second outer pendulum $P_2$ | 3.30 kg |
| Total gyrating mass | 5.70 kg |
| Total gyrating mass | 5.70 kg |
| Non gyrating mass | 52.00 kg |
| Total mass | 57.70 kg |

The axial dimension of the converter, taken without the input and output shafts is nearly 540 mm and it is roughly contained within a cylindrical surface the diameter of which is 300 mm.

However, this converter may be made, partly or totally of other materials that duralumin.

What we claim is:

1. A motion converting device comprising: a fixed base having a longitudinal axis of symmetry and defining an internal closed rolling contact path, a tapered rolling pendulum member disposed within the base and having an external rolling contact path and a longitudinal axis of rotation, said rolling contact paths being adapted for continuous rolling contact with one another and being of complementary arcuate shape with substantially equal radii of curvature and a common center which is radially spaced from the longitudinal axis of the base at all times, means for rotatively supporting the pendulum within the base for continuous rolling contact therebetween, input means for rotatively driving the pendulum member and means for shifting the pendulum along the axis of the base while maintaining the rolling contact and continuous intimate tangential bearing of said pendulum rolling path against said base rolling path thus to produce rolling rotation of the pendulum around the inside of the base with a resulting orbital travel of the axis of the pendulum around the axis of the base, the axial shifting of the pendulum being such as to cause angular departure between the axis of rotation of the pendulum and the longitudinal axis of the base and output means associated with said pendulum for deriving an output therefrom.

2. A motion converting device as defined in claim 1 wherein one of the rolling contact paths is engraved with fine parallel and axially extending splines.

3. Apparatus as defined in claim 1 wherein the means for rotatively supporting the pendulum comprises a shaft and a universal joint interconnecting the shaft and the pendulum at the apex end thereof.

4. Apparatus as defined in claim 1 wherein the input means comprising an input shaft connected with the pendulum by means of a first universal joint and the output means comprises, a second outer pendulum of similar shape to the first pendulum and telescopicly disposed thereover for rolling contact therewith, an output shaft connected to the second pendulum through a second universal joint and means for axially shifting the second pendulum relative to the first pendulum and the base whereby the ratio of the input shaft speed with respect to the common gyrating speed of the two pendulum axes about the axis of the base is proportional to the shift of the first universal joint center from a reference point while the ratio between the speed of the output shaft and the input shaft is equal to the ratio between the shifts of the second and first universal joint centers respectively such that the speed parameters of the overall device may be controlled by axial shifting of the joint centers relative to a reference point.

5. Apparatus as defined in claim 2 wherein the splines appear in a plurality of axially spaced sets on contiguous substantially conical segments which together approximate said arcuate shape.

6. Apparatus as defined in claim 4 wherein the base member is fixed and the two universal joints are linked to the input and output shafts respectively by means of telescopic couplings, and shift control means associated with each of said couplings.

7. Speed converter apparatus comprising: a base members defining an internal annular rolling contact path, first and second rolling contact tapered pendulum members telecopicly disposed within one another and within the base with the apices thereof being at least adjacent one another, said pendulums defining external rolling contact paths which, along with the rolling contact path of the base, are of complementary arcuate shape with substantially equal radii of curvature and a common center which lies radially remote from the axis of the base, a first input shaft connected through a first universal joint to a first pendulum and a second output shaft connected through a second universal joint to the second pendulum, and means for axially shifting the first and second pendulums relative to one another and the base to vary the speed ratio between the two shafts relative to the base member along the common axis of said shafts.

8. A motion converting device comprising: a first element having an internal annular rolling contact surface and having an axis of symmetry, a second member disposed within the first member and having an external rolling contact surface and having an axis of symmetry, said rolling contact paths being of complementary arcuate shape with substantially equal radii of curvature the common center of which is radially spaced from the axis of symmetry of the first member at all times, means for rotatively supporting one of the members relative to the other for rolling contact between the rolling contact surfaces, input means for rotatively driving one of the members, means for shifting one of the members along its axis relative to the other member while maintaining the rolling contact thus to produce angular displacement between the axes of symmetry, and output means operatively associated with the second member for deriving an output therefrom.

* * * * *